United States Patent
Freeland et al.

(10) Patent No.: US 7,526,163 B2
(45) Date of Patent: Apr. 28, 2009

(54) LOCATABLE CABLES AND CABLE COMPONENTS THEREFOR

(75) Inventors: Riley S. Freeland, Newton, NC (US); William C. Hurley, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/606,694

(22) Filed: Nov. 30, 2006

(65) Prior Publication Data

US 2008/0129622 A1    Jun. 5, 2008

(51) Int. Cl.
G02B 6/44 (2006.01)
H01B 11/22 (2006.01)

(52) U.S. Cl. .................. 385/101; 385/100

(58) Field of Classification Search .............. None
See application file for complete search history.

(56) References Cited

U.S. PATENT DOCUMENTS

| | | | | |
|---|---|---|---|---|
| 3,865,466 A * | 2/1975 | Slaughter | ............. | 385/103 |
| 4,334,227 A | 6/1982 | Marks | ............. | 343/719 |
| 4,670,717 A | 6/1987 | Sender | ............. | 324/338 |
| 5,106,175 A | 4/1992 | Davis et al. | ............. | 385/100 |
| 5,184,076 A * | 2/1993 | Ehnholm | ............. | 324/318 |
| 5,305,411 A | 4/1994 | Arroyo | ............. | 385/109 |
| 6,915,050 B2 | 7/2005 | Koyasu et al. | ............. | 385/105 |
| 7,113,679 B2 | 9/2006 | Melton et al. | ............. | 385/113 |
| 7,197,214 B2 * | 3/2007 | Elkins et al. | ............. | 385/100 |
| 7,250,867 B2 * | 7/2007 | Sakama et al. | ............. | 340/572.7 |
| 2002/0034365 A1 | 3/2002 | Vogelsang | ............. | 385/100 |
| 2005/0200539 A1 | 9/2005 | Forster et al. | ............. | 343/749 |
| 2007/0056683 A1 * | 3/2007 | Manes et al. | ............. | 156/264 |
| 2008/0001838 A1 * | 1/2008 | Huang et al. | ............. | 343/795 |

FOREIGN PATENT DOCUMENTS

| | | |
|---|---|---|
| EP | 0435585 | 7/1991 |
| EP | 0903805 | 3/1999 |
| EP | 1191354 | 3/2002 |
| WO | WO91/04503 | 4/1991 |
| WO | WO2006/115541 A1 | 11/2006 |

OTHER PUBLICATIONS

DuPont Corp., "DuPont Microcircuit Materials Thick Film Composition-5033 Polymer Silver- For RFID @ 13.56 MHz and UHF Applications", Jan. 06, pp. 1-3.

Global Identification, Patrick Sure, "The Silver Ink Printed Antenna", Oct. 5, pp. 70-72.

Patent Cooperation Treaty, International Search Report for International Application No. PCT/US2007/024447, May 27, 2008, 2 pages.

* cited by examiner

*Primary Examiner*—Omar Rojas
(74) *Attorney, Agent, or Firm*—C. Keith Montgomery

(57) ABSTRACT

Cables that are detectable and/or identified from a distant location using detection equipment are disclosed. The cables include at least one communication element, a jacket, and at least one antenna element such as a parasitic antenna element. In one embodiment, the antenna element is at least partially formed from a conductive ink as a portion of a cable component that is generally deployed along a longitudinal direction of the cable. In use, the antenna element is capable of providing a predetermined electromagnetic signature for a predetermined frequency transmitted in its proximity, thereby indicating the location and/or identification of the cable for the craft.

9 Claims, 5 Drawing Sheets

LOCATABLE CABLES AND CABLE COMPONENTS THEREFOR

FIELD OF THE INVENTION

The present invention relates generally to cables and/or cable components for locating and/or identifying the same from a distance. More specifically, the present invention integrates one or more antenna elements that are responsive to discrete RF components as a portion of the cable and/or cable components for locating the same.

BACKGROUND OF THE INVENTION

Network providers have many options for installing cables within a network. For instance, cables can be visible, as from pole to pole in an aerial installation, or hidden from sight, such as in ducts or directly buried. Many locations prefer or require that cables are underground so that the poles and cables do not distract from the scenery. Moreover, there is a generally a lower maintenance cost for underground cables. Consequently, many communication and power companies locate cables underground.

Accurately locating and identifying installed cables is important such as when construction takes place close to the cable or when the cable requires entering for routine maintenance or repair. Often times, records and "as-built" maps of cable networks are not sufficiently accurate for locating and identifying the cables. One drawback for cables installed underground is locating and identifying them after installation because they are not visible. Additionally, locating and identifying cables can also be difficult with aerial installations. More specifically, locating an aerial cable may be relatively easy since it is visible, but there is still the question as to whether it is the desired cable.

The most commonly used method for locating underground cables, commonly called toning, is to induce a electromagnetic signal onto a metallic element in, or associated with, the underground cable at an access point such as a pedestal or closure. In other words, the cables have a metallic wire dedicated for toning either as part of the cable or buried in close proximity to the cable. A handheld antenna having a receiver unit is used for following the path of the cable indicated by the continuous path of the metallic wire. If the metallic element is not grounded, the path of the cable can be followed up to several kilometers from the point of signal induction. However, this method requires a metallic element within the cable or located in close proximity to the cable. Metallic based cables such as twisted pair communications cables or coax cables by their nature have a metallic element, however, many cables do not have a suitable element for sending a toning signal. By way of example, many fiber optic cables are dielectric designs that advantageously exclude metallic elements, thereby avoiding the issues associated with lightning strikes and grounding the cable; however, these dielectric cables are not tonable. Moreover, many communication companies prefer dielectric cables if possible for avoiding issues associated with lightning strikes and grounding the cable.

Because of the need for rodent protection, many direct buried cables use metal armor, which may allow toning. However, expecting that metallic armor will work as a toning element is problematic, since a toning element needs to have good electrical insulation from the earth ground. A common damage in lightning prone areas is that current surges from lightning burns through the jacket of an armored cable at regular intervals and the armor becomes grounded. In many cases, there is no damage to the cable transmission characteristics, but the armor becomes grounded and a toning signal will not travel in the armor past the grounded point. Like the armor cables, lightning damage to the jacket over the toning wire can cause grounding and significantly inhibit the toning capacity for locating the cable. Whereas, burying a wire in close proximity to the cable will have similar issues such as becoming grounded or completely severed by lightning strikes, thereby inhibiting toning capability. Thus, other methods for detecting cables were developed.

For instance, U.S. Pat. No. 5,106,175 discloses a method for using electronically resonant markers for locating and identifying a cable. The electronically resonant markers receive incident electromagnetic radiation at a first frequency and second frequency and re-radiates at an intermodulation frequency (a function of the first and second frequencies) that is different from the two incident frequencies. The electronically resonant markers comprise a foil circuit disposed on a planar surface of a relatively thin dielectric substrate along with a surface mounted diode. The shape of the foil pattern and the arrangement of portions thereof on the planar surface of the dielectric substrate provide capacitive and inductive elements. Further, the diode acts as a signal mixer in the foil circuit for creating the intermodulation frequency from the incident first and second frequencies. This foil circuit structure is relatively complex and adds significant cost to the cable when using enough antenna elements for locating and identifying cables. The present invention solves the shortcomings of the prior methods for locating cables.

SUMMARY OF THE INVENTION

The present invention is directed to cables that are detectable and/or identifiable from a distant location using detection equipment. The cables include at least one communication element, a jacket, and at least one antenna element such as a parasitic antenna element. In one embodiment, the antenna element is at least partially formed from a conductive ink as a portion of a cable component that is generally deployed along a longitudinal direction of the cable. In use, the antenna element is capable of providing a predetermined electromagnetic signature for a predetermined frequency transmitted in its proximity, thereby indicating the location and/or identification of the cable for the craft.

Another aspect of the present invention is directed to a cable including at least one communication element, a jacket, and at least one antenna element. The antenna element is at least partially formed from a conductive ink that is disposed on a tape and the tape is deployed along a longitudinal direction of the cable. The at least one antenna element is capable of providing a predetermined electromagnetic signature for an incident electromagnetic signal transmitted in its proximity, thereby indicating the location and/or identification of the cable for the craft.

Still another aspect of the present invention is directed to a cable including at least one communication element, a jacket, and a plurality of antenna elements disposed on one or more cable components. A first antenna element is capable of reradiating an electromagnetic signal of a first predetermined frequency transmitted in its proximity and a second antenna element is capable of reradiating an electromagnetic signal from a second predetermined frequency transmitted in its proximity, thereby indicating a change in the characteristics of the cable at the second antenna element. Other embodiments of the present invention include a cable component having at least one parasitic antenna element for use within a cable for providing a predetermined electromagnetic signature for an incident signal transmitted in its proximity.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain principals and operations of the invention.

DETAILED DESCRIPTION OF THE INVENTION

Figure 1:
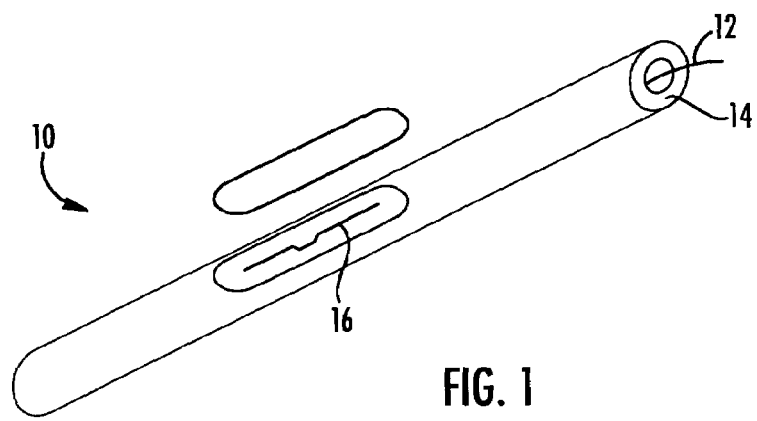
FIG. 1 depicts a cable with a portion of the jacket removed thereby revealing an antenna element in the cable according to the present invention.

Reference will now be made in detail to the present preferred embodiments of the invention, examples of which are illustrated in the accompanying drawings. Whenever practical, the same reference numerals will be used throughout the drawings to refer to the same or like parts. FIG. 1 depicts an explanatory cable 10 according to the present invention. Cable 10 includes at least one communication element 12 such as an optical waveguide, an antenna element 16 that is non-continuous along the length of cable 10, and a cable jacket 14. Cable 10 includes one or more antenna elements 16 deployed along a longitudinal axis of cable 10 such as disposed in, or on, a cable component. Including one or more antenna elements 16 allows location of cable 10 by observing its interaction with detection equipment such as a transceiver or the like. In other words, the antenna elements 16 act as a "parasitic antenna" that change the characteristics of the radiated energy and/or reflect radiated energy. The concepts of the present invention are advantageous for any suitable cable, but are especially advantageous with "dielectric" cable designs. Simply stated, although the antenna elements are conductive, they do not require grounding for lightning protection (i.e., a "dielectric" cable design) since the antenna elements are also non-continuous along the length of the cable. Cable 10 may also include other cable components such as strength elements, buffer tubes, inner jackets, water-blocking components, armor, ripcords, or other suitable cable components. As used herein, "communication element" means an element capable of transmitting a communication signal such as an optical fiber or a metallic element such as a copper wire, a twisted pair of copper wires, or the like; however, metallic elements may alter the performance of the present invention.

Antenna elements 16 are useful for locating and/or identifying cable 10 because they produce a predetermined signature (e.g., a change in current at the detection equipment and/or backreflection of RF energy for detection) when one or more predetermined frequencies are transmitted in its proximity. Unlike the other detection systems, a "parasitic antenna element" according to the present invention does not create an intermodulation frequency (e.g., different frequency) from a first and a second incident frequencies broadcast by the detection equipment. Generally speaking, a plurality of antenna elements 16 are included along the length of the cable (i.e., a lengthwise array of antenna elements) with a predetermined spacing therebetween for locating the cable. Spacing antenna elements 16 between about one meter and about fifteen meters is sufficient for locating the cable, but other spacings are possible. Additionally, the use of different antennas designs is possible along the length of the cable for encoding information about the cable such as branch locations (i.e., nodes), optical fiber count, etc. for the cable. Moreover, antenna elements 16 are also advantageous since they allow a relatively low-cost structure incorporated into, or on, one or more cable components.

Figure 2:
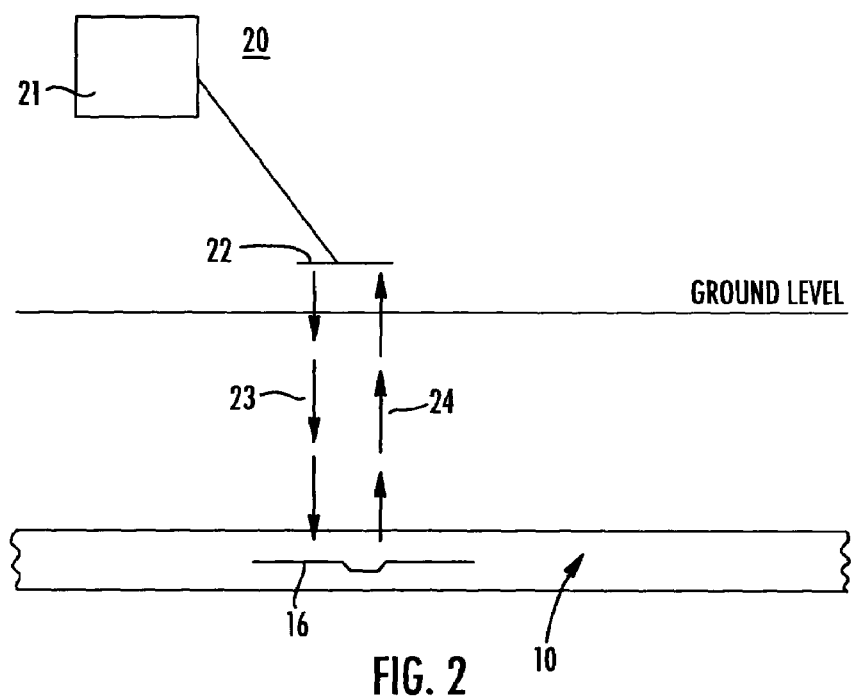
FIG. 2 depicts the cable of FIG. 1 within the ground being located using detection equipment.

FIG. 2 schematically depicts one application of the present invention in the field. Specifically, cable 10 is located below ground level in a buried application and the craft uses detection equipment such as a transceiver 21 for locating and/or identifying the same. As depicted, transceiver 21 includes a detection antenna 22 for emitting an incident electromagnetic signal 23 toward the ground. Incident electromagnetic signal 23 penetrates the ground and impinges on antenna element 16 of cable 10. As discussed below, the design of the antenna element will determine the electromagnetic frequencies to which it will respond and create an electromagnetic signal 24 (i.e., predetermined signature) that is cumulative for detection. Transceiver 21 detects the resultant electromagnetic signal 24 using detection antenna 22. Transceiver 21 then processes the electromagnetic signal 24 for notifying the craft that the predetermined signal for cable 10 was detected.

By way of example, the simplest transceiver element would merely transmit one or more frequencies, or oscillate the frequencies about the resonant frequency of the system, and report detection of the appropriate signal indicating detection of the cable. A more complex transceiver unit would report the detected frequency or frequencies for assisting with detection and/or identification of cable 10. The design of the transceiver antenna 22 may focus the incident electromagnetic signal 23 from transceiver 21 as well electromagnetic signal 24 to transceiver 21, thereby improving performance of the same. Likewise, the design of antenna elements 16 may focus the return signal (i.e., the reflected power) in a given direction, which depletes the signal in other directions. Additionally, attenuation of electromagnetic signal 24 (i.e., penetration depth into the ground) can depend on several factors such as soil type, water content, frequency, and the like. Generally speaking, all other things being equal, smaller frequencies (e.g., longer wavelengths) have less attenuation and greater penetration into the ground. More sophisticated detection equipment may incorporate a GPS transceiver with a recording device so that the location of the cable is recorded along with the specific cable signature for eventual downloading into a mapping database.

As mentioned above, one predetermined signal for detection causes a change in current at the detection equipment. Simply stated, with detection equipment having sufficient proximity and radiated power couples an electric field between detection antenna 22 with one or more antenna elements 16 (e.g., the parasitic antenna) of cable 10, thereby providing a detectable change in current at detection antenna 22. In other words, the mutual impedance between detection antenna 22 and one or more antenna elements 16 of the cable couples the currents and fields of the same (i.e., both antennas) resulting in a detectable change in current. Illustratively, if detection antenna 22 produces a driving frequency of 250 MHz (e.g., a wavelength of about 1.2 meters) a simple half-wave dipole antenna tuned for this frequency changes the current by about 25% depending on distance between antenna elements 16 and detection antenna 22 and the spacing of the plurality of antenna elements 16 along the length of the cable.

Another predetermined signal for detection is the portion of incident electromagnetic signal 23 from transceiver 21 backreflected toward detection antenna 22 of transceiver 21. Simply stated, with detection equipment having sufficient proximity and radiated power antenna element 16 reflects one or more predetermined frequencies (e.g., fundamental frequency plus possible harmonics) transmitted from the detection equipment, thereby locating and/or identifying the cable. Illustratively, if detection antenna 22 produces a driving frequency of 250 MHz a simple half-wave dipole antenna tuned for this frequency has a reflected power about −20 dB below the incident wave for detecting the cable. Ground penetrating radar (GPR) is a raditive, but non-resonant method that monitors backreflection of electromagnetic radiation from buried metallic objects, whereas antenna elements 16 in the cables of the present invention interact resonantly at specific frequencies with transceiver 21.

Antenna elements 16 are at least partially formed from suitable conductive materials such as a relatively small diameter metallic wire or foil such as copper or aluminum, a conductive ink, or the like. Antenna elements 16 can be on, or in, a suitable cable component. For instance, a cable component such as a tape structure has a series of half-wave dipole antennas (i.e., a series of relatively short antennas) attached thereto, thereby providing the desired signature for a predetermined frequency. For instance, each half-wave dipole antenna element has a length between about between about 10 centimeters and about 2000 centimeters for interacting with the predetermined frequency transmitted in its proximity (e.g., 1 Gigahertz to 100 Megahertz). By way of example, one design uses a longitudinal tape having a series of 24 gauge copper wires (i.e., having a diameter of about 0.5 millimeters) with a length of about $0.2376\lambda$ (where $\lambda$ is the predetermined transmitted frequency from the detection equipment) attached thereto with a spacing of about 1.1 meters between antenna elements. The tape structure forms a portion of the cable such as wrapping the tape structure about a core of the cable. Of course, the concepts of the present invention can use other types of antenna designs, materials, locations, or the like.

For instance, a similar tape structure can use a different type of conductive material such as a conductive ink printed onto the tape. An example of a suitable conductive ink is available under the tradename 5033 from Dupont. By way of example, this conductive ink is printed on a tape such as a paper tape and then is wrapped about a portion of the cable. Likewise, other conductive inks may be printed onto other cable components such as a Mylar tape, a non-woven tape, or other suitable components, but the conductive inks should have suitable properties such as conductivity, durability, and flexibility.

Figure 3A:
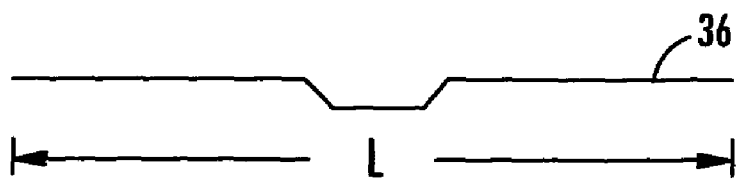
FIGS. 3a-3c schematically depicts three different exemplary types of antenna elements useful with the concepts of the present invention.
Figure 3B:
Figure 3C:
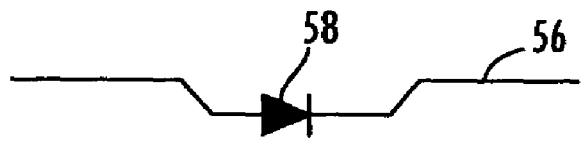

As stated above, the concepts of the present invention can use any suitable design for antenna elements 16. By way of example, FIGS. 3a-3c schematically depict three different types of exemplary antenna designs suitable with the concepts of the present invention. FIG. 3a depicts an antenna element configured as a half-wave dipole antenna element 36, which is tuned to a specific resonant frequency and radiates omni-directionally. More specifically, the dipole antenna is formed by a conductive portion having a total length L that is smaller than its predetermined tuned wavelength. For instance, the length L of the antenna element is about one-half wavelength of the transmitted signal, but other designs are possible such as a folded dipole or short dipole where the length L is much smaller than the incident wavelength. Additionally, other factors besides length L can affect performance such as thickness of the conductive portion, spacing of the antenna elements along the cable, and the like. For instance, tuning the dipole antenna design is accomplished by changing its overall length, load, and/or spacing between adjacent antennas along the length of the cable, thereby changing its detection signature.

Other more complex antenna designs are also possible. FIG. 3b depicts a representation of a fractal antenna 46. Fractal antenna elements 46 are advantageous since they produce "fractal loading", which allows a smaller antenna design (e.g., such as 2 to 4 times smaller) for the desired frequency. Consequently, the number of antenna elements per unit length along the cable can increase, thereby allowing for a stronger signal for detection of the cable. Additionally, fractal antennas are directional in their ability to receive and reradiate signals and may effectively induce a stronger signal at the detection equipment when appropriately oriented. Designs of fractal antennas may also have multiple resonant frequencies or a non-linear frequency response. The element for modifying the reradiated signal from the incident signal can be used on a fractal antenna. Of course, other antenna designs are possible such as arrays or other suitable designs.

Antenna designs that alter the characteristics of the relationship between the incident electromagnetic signal and the detected signal are also possible with the present invention. FIG. 3c depicts a dipole antenna element 56 having an element 58 that significantly alters the incident signal. For instance, element 58 is shown as a diode 48 that changes the reflected signal by doubling the frequency of the incident signal of the appropriate frequencies. Thus, besides locating the cable other information may be encoded based upon the reflected signal frequency. Additionally, the antenna elements that alter the characteristics of the incident signal may be used with antenna elements that do not alter the incident signal, thereby creating markers along the cable. Other variations include antenna elements that induce a time delay for the reflected or reradiated signal by using passive components such as capacitive or inductive elements. Consequently, the locations such as branch points along the cable can be identified using the time delay. By way of example, the first branch point of the cable has a time delay of about two milliseconds, the second branch point of the cable has a time delay of about four milliseconds, etc.

Figure 4:
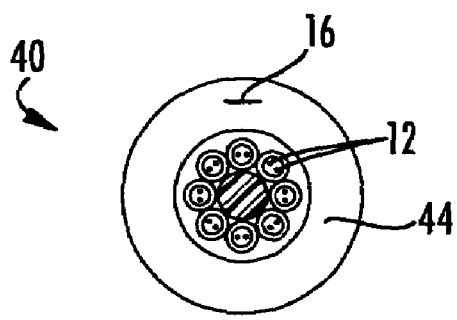
FIG. 4 depicts a cross-sectional view of another fiber optic cable having an antenna element embedded in the jacket according to the present invention.
Figure 5:
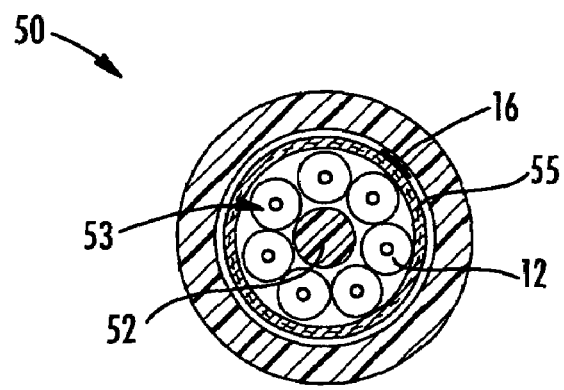
FIG. 5 depicts a cross-sectional view of a fiber optic cable having an antenna element in a cavity of the cable according to the present invention.

As stated, the antenna elements may be located in, or on any suitable cable component. Illustratively, FIG. 4 is a cross-sectional view of a cable 40 having one or more antenna elements 16 embedded within a jacket 44. Likewise, a filler rod, buffer tube, a strength member or other suitable cable components could have one or more antenna elements 16 disposed therein. Furthermore, one or more antenna elements need not be embedded within a component, but may be printed or attached thereon. For instance, a jacket or other suitable cable component can have one or more antenna elements printed thereon. Optionally, a protective layer may be applied thereover for inhibiting damage to the same. On the other hand, FIG. 5 represents a cross-sectional view of a cable 50 having a cavity 53 containing one or more cable components 52, with antenna element 16 being disposed on a cable component within cavity 53 such as on a tape 55 or like. Moreover, cables can have more than one longitudinal component with antenna elements. For instance, each buffer tube of a stranded loose tube cable design could have it own discrete antenna elements for location and/or identification.

Figure 6:
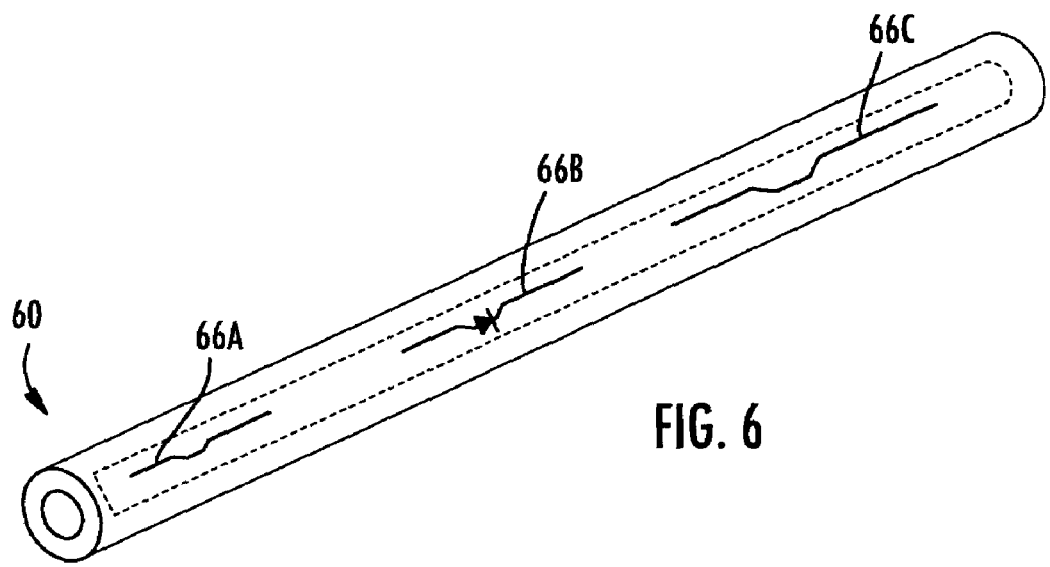
FIG. 6 depicts a locatable fiber optic cable with a longitudinal element having multiple antenna elements according to the present invention.

Additionally, cables can have antenna elements that have different signatures such as for different frequencies. For instance, FIG. 6 depicts a cable 60 that includes a longitudinal element 65 such as a tape (represented by the dashed lines) having different antenna elements 66A, 66B, and 66C attached thereto along its length. More specifically, antenna elements 66a, 66b and 66c are tuned for different predetermined frequencies, thereby allowing for both location and identification.

Figure 7:
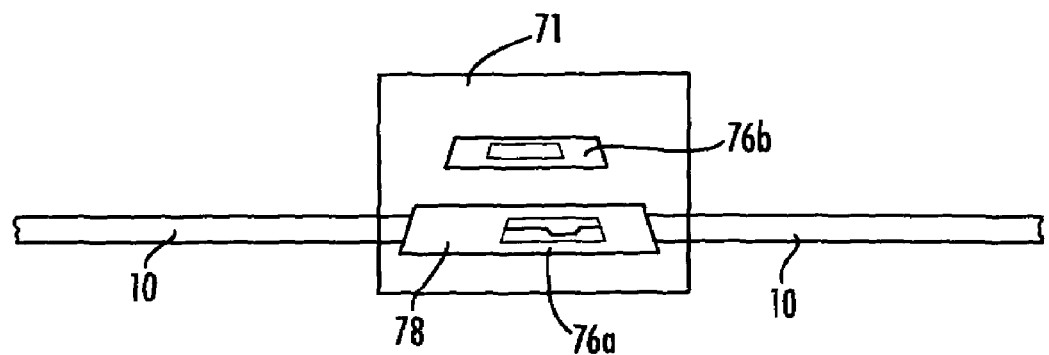
FIG. 7 depicts a system component associated with a fiber optic cable with an antenna element.

Additionally, the present invention may be used in other applications where locating and/or identification of structures associated with cables is desired. FIG. 7 depicts an object such as a splice closure 78 located in a buried housing 71 that is fed by cable 10 according to the present invention. As depicted, antenna element 76a is placed within splice closure 78 for locating and/or identifying the same. In addition or alternately, one or more antenna elements 76b is placed within the buried housing for locating and/or the same. This application is useful where there are one or more buried housings for a group of cables that are routed therethrough, but only specific housings splice cable 10 therein.

Figure 8:
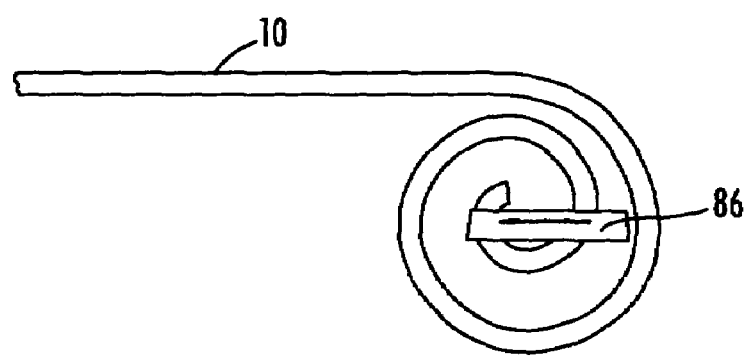
FIG. 8 depicts a coiled end of a cable having an antenna element according to the present invention.

FIG. 8 depicts another use for an antenna element according to the present invention. Occasionally when a cable system is installed, different sections of the cable system will be installed at different times. Consequently, to protect a cable end portion for splicing later, the end of the cable is often coiled and buried until needed such as when an additional cable is installed later. As shown, cable 10 is coiled before burying and an antenna element 86 is attached thereto so that the coiled portion is easily located when needed.

Figure 9:
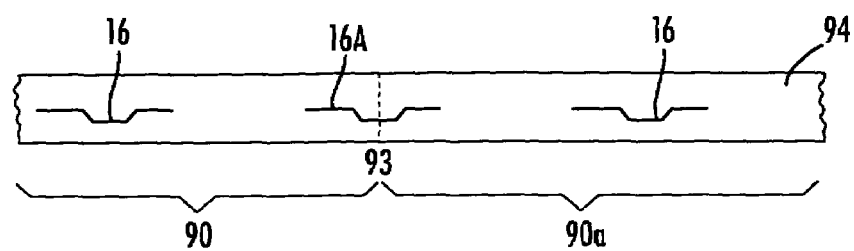
FIG. 9 depicts a cable having an antenna element for identifying a characteristic change point in the cable.

FIG. 9 depicts an example of a cable 90 having a plurality of antenna elements that indicate a change in the cable characteristics according to the present invention. Specifically, cable 90 changes characteristics at a location 93 (from cable 90 to cable 90a), but the change is not visible with an unbreached jacket 94. An example of a change in cable characteristics is a change in the number of communication elements such as a change in the number of optical fibers along the length of the cable. As shown, cable 90 has an antenna element 16a with a different predetermined signature at the location where it changes characteristics so that the change point can be located and/or identified. Additionally, cable 90 also includes antenna elements 16 for locating the cable, but antenna elements 16 have a different predetermined signature from antenna element 16A for distinguishing change point 93 from the remainder of the cable. When several antenna elements, which respond to different predetermined frequencies, are used together for assisting in identification, they are closely grouped with a longer spacing between groupings.

Figure 10:
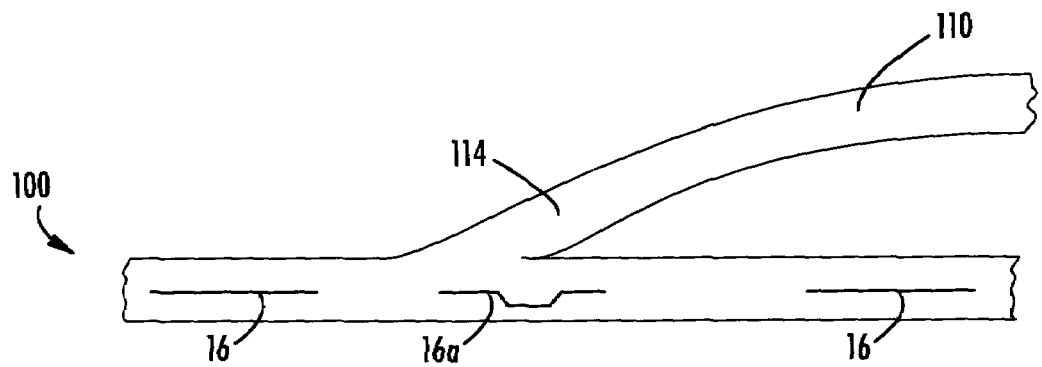
FIG. 10 depicts a cable having an antenna element for identifying a branch location in the cable.

It is also possible to mark other changes in cable characteristics according to the concepts of the invention. For instance, FIG. 10 depicts cable 100 that includes a factory installed branch location 114 where a second cable 110 is split off from cable 100 for distribution purposes. Again, a first type of antenna element 16 is used along a length of cable 100 for locating and/or identifying the same and a second type of antenna element 16a is used for marking branch location 114. Consequently, the detection equipment will reveal a distinct change in the signature, thereby indicating the location for the branch location 114. Additionally, other information could also be included in one or more antenna elements 16a identifying the access point 114.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

That which is claimed:

1. A cable comprising:
   at least one optical fiber;
   a jacket; and
   at least one antenna element, the at least one antenna element being at least partially formed from a conductive ink that is disposed on a tape, the tape being deployed continuously along a longitudinal direction of the cable, the at least one antenna element is capable of providing a predetermined electromagnetic signature for an incident electromagnetic signal transmitted in its proximity.

2. The cable of claim 1, wherein the at least one antenna element further includes a diode.

3. The cable of claim 1, wherein the at least one antenna element is selected from the group consisting of a dipole antenna, an antenna having a diode, a fractal antenna, or an antenna having an active component.

4. The cable of claim 1, wherein the at least one antenna element provides a predetermined time delay.

5. The cable of claim 1, wherein the at least one antenna element has a length between about 10 centimeters and about 2000 centimeters for interacting with the incident signal.

6. The cable of claim 1, the tape being disposed within a cavity of the cable.

7. The cable of claim 1, further comprising a plurality of antenna elements spaced along a length of the tape.

8. The cable of claim 1, further comprising a plurality of antenna elements, wherein at least two of the antenna elements are capable of reradiating electromagnetic signals of different predetermined frequencies transmitted in their proximity.

9. The cable of claim 1, wherein the at least one antenna element is a fractal antenna.

* * * * *